United States Patent Office 2,921,368
Patented Jan. 19, 1960

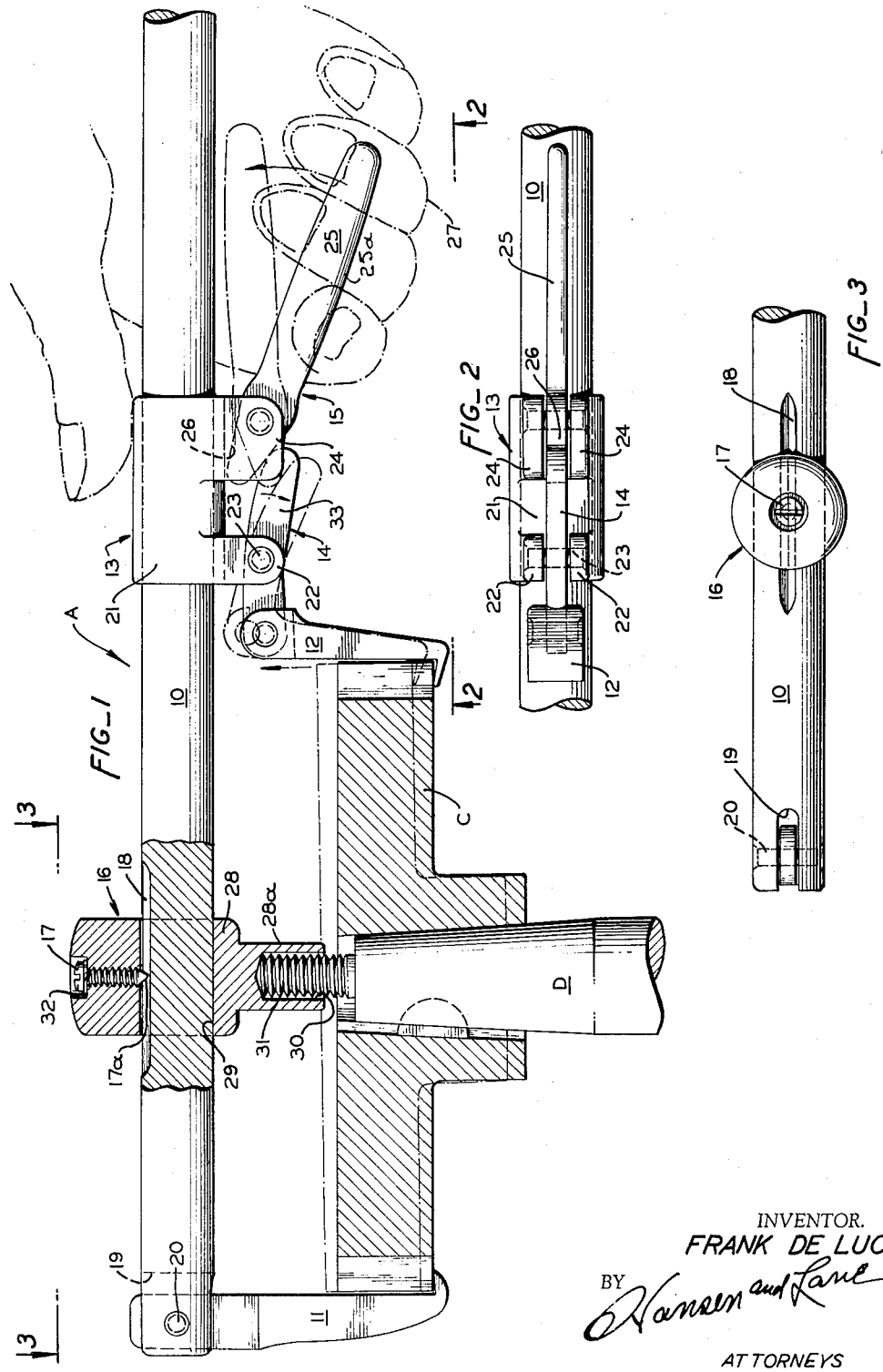

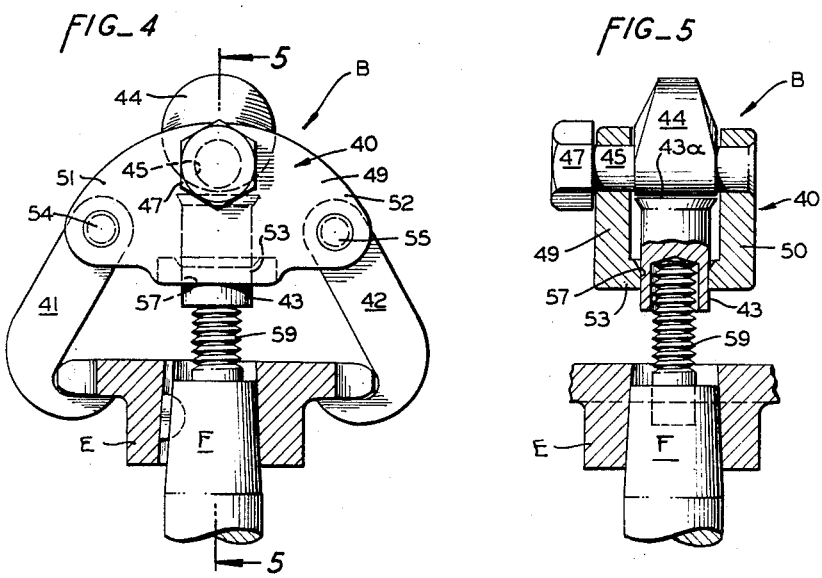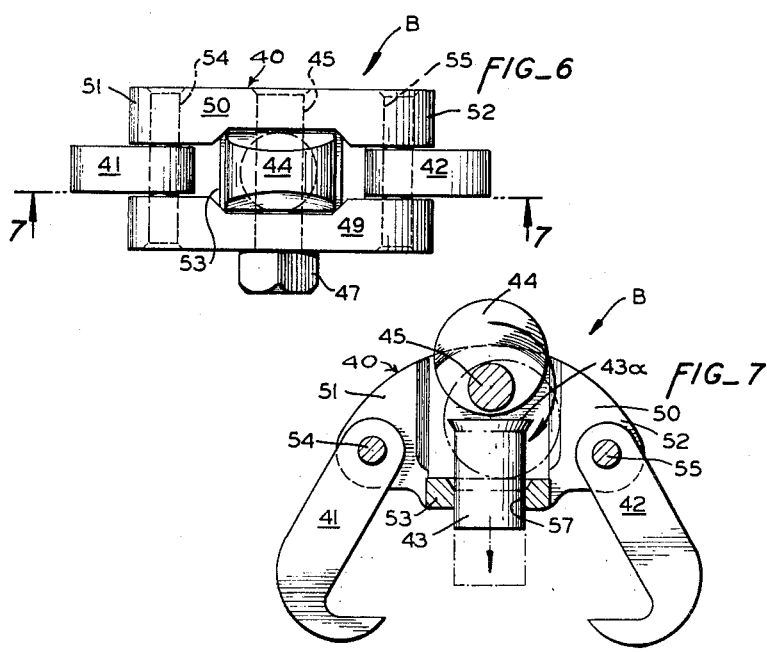

2,921,368

GEAR PULLER

Frank De Lucia, Sonora, Calif.

Application February 11, 1957, Serial No. 639,404

3 Claims. (Cl. 29—244)

The present invention relates to a gear puller, and pertains more particularly to a gear puller for freeing a gear from a tapered shaft, and operation in places where there is only a small amount of clearance around a gear to be pulled.

In many mechanisms, for example, chain saws, the gears and sprockets are mounted in such closely crowded quarters as to be inaccessible by some types of gear pullers. It also is frequently desirable to have a gear puller which will operate on gears of a large variety of diameters.

The present invention contemplates the provision of an improved and simplified gear puller.

The invention also provides a gear puller which is capable of operation where only a small amount of clearance is provided around a gear to be pulled.

The invention further provides an improved and simplified gear puller which is adjustable to operate on gears of different diameters.

These, and other objects and advantages of the invention, will be apparent from the following description and the accompanying drawings, wherein:

Fig. 1 is a side elevational view of a gear puller embodying the invention as it appears when pulling a gear from a tapered shaft, portions being shown sectionally, and a hand gripping the device being shown in broken lines.

Fig. 2 is a fragmentary bottom view taken in the direction of the arrow 2—2 of Fig. 1.

Fig. 3 is a fragmentary top plan view taken in the direction of the arrows 3—3 of Fig. 1.

Fig. 4 is a side elevational view of a modified form of the invention, a sprocket on which the device is operating being shown sectionally.

Fig. 5 is a sectional view taken along line 5—5 of Fig. 4, portions of a sprocket being broken away.

Fig. 6 is a top plan view of the gear puller shown in Figs. 4 and 5.

Fig. 7 is a sectional view taken along line 7—7 of Fig. 6, the broken lines showing the actuating cam and plunger in operated condition.

Briefly, the form A of the invention shown in Figs. 1–3 comprises a body bar 10 having one gear engaging hook 11 pivotally mounted on one end thereof, and an adjustable second hook 12 mounted on a slider 13. The slider 13 is mounted for longitudinally sliding adjustment on the bar 10, whereby the second hook 12 may engage gears of different diameters. Interacting levers 14 and 15, pivotally mounted on the slider 13, provide force multiplying means for forcibly moving the second hook 12 toward the bar 10.

A shaft engaging thrust member 16 is slidably mounted on the body bar 10, and is guided for longitudinal sliding adjustment thereon by a set screw 17 which rides in a groove 18 in the body bar.

In the modified form of the invention shown in Figs. 4–7, a gear puller B comprises a U-shaped body portion 40 having a pair of gear engaging hooks 41 and 42 pivotally mounted thereon, and a shaft engaging plunger 43 is slidably mounted in a hole provided therefor in the bottom of the body member.

A circular cam 44 is affixed eccentrically to a pin 45 having a hexagonal head 47 thereon for engagement by a wrench (not shown) to rotate the cam into thrust engagement with the plunger 43 for providing the gear pulling stress.

Referring to the drawings in detail, the gear puller A (Figs. 1–2) which may be of suitable metal such as steel, comprises the body bar 10, which is herein illustrated as being of circular cross sectional shape, although other shapes, such as for example, hexagonal, obviously would be suitable. A notch 19 is provided in one end of the bar 10, and the first gear engaging hook 11 is pivotally mounted therein in a pin 20.

The first hook 11 faces inwardly for engaging the under side of a gear C to be pulled from a tapered shaft D. The slider 13 comprises a tubular body portion 21 fitted for axial slidable movement on the body bar 10. A pair of ears 22 (Figs. 1 and 2) extend downwardly from the tubular portion 21 and the hook supporting first lever 14 is pivotally mounted on a pin 23 extending transversely between these ears.

The second hook 12 is pivotally mounted on the free end of the first lever 14 facing the first hook 11, so that the two hooks 11 and 12 may be fitted beneath opposite sides of the gear C as shown in Fig. 1 for pulling engagement therewith. The other end of the first lever 14 from that upon which the second hook 12 is pivoted is mounted beneath the short nose portion 26 of the second lever 15, which is pivotally mounted between a second pair of ears 24 which also extend downwardly from the underside of the slider body 21. The longer arm 25 of the second lever 15 preferably is rounded on its under side 25a to facilitate the gripping of it by an operator's hand 27 (Fig. 1).

The shaft engaging thrust member 16 comprises a body portion 28 having a hole 29 therethrough to receive the body bar 10 in fitted, slidable relation therein. A shaft receiving socket 30 is formed in the reduced lower end portion 28a of the body 28 to receive a threaded extension 31 on the end of the shaft D from which the gear C is to be pulled. The shaft engaging thrust member 16 is of a length relative to the gear engaging portions of the hooks 11 and 12 to bear endwise against the shaft D when the hooks 11 and 12 engage a gear C to be pulled. Since only a slight endwise movement of the gear is sufficient to free it from the shaft, the hook 11 will balance the pulling pressure exerted on the hook 12 by action of the lever 25 during this slight relative endwise movement of the gear and the shaft to free the former.

The guide screw 17 is screwed into a threaded hole provided therefor axially of the upper end of the slider body 28, and seats on a lock washer 32 with its pointed lower end 17a riding in the longitudinally extending groove 18 in the top of the body bar 10.

In using the gear puller A (Figs. 1–3) the first hook 11 is hooked beneath the edge of a gear C to be pulled, and the shaft engaging thrust member 16 is then moved lengthwise of the body bar 10 to a position where its bottom socket 30 will fit over the threaded extension 31 of a shaft D from which the gear is to be pulled. If no threaded extension is provided on the shaft, a suitable replacement therefor should be used, such as a short length of bar stock, so as to mount the device substantially as shown in Fig. 1 with both hooks engaged and the shaft engaging thrust member bearing endwise on the shaft.

The slider 13 then is moved lengthwise of the bar 10 to position the second hook 12 beneath the opposite edge of the gear to be pulled from that engaged by the first hook 11. By then gripping the hand grip arm 25 of the lever 15, the short nose 26 thereof will be forced downwardly, thereby exerting a powerful force on the arm 33 of the hook supporting lever 14, and moving the latter from its solid to its broken line positions of Fig. 1. This moves the hook 12 upwardly relative to the shaft engaging member 16, and thereby pulls the gear C free of the tapered shaft D.

Referring now to the details of the modified form B of the invention shown in Figs. 4–7 inclusive, the U-shaped body portion 40 comprises a pair of substantially identical plate-like side leg portions 49 and 50, which extend laterally outwardly at 51 and 52 beyond the transversely extending bottom portion 53. The gear engaging hooks 41 and 42 are pivotally mounted on pins 54 and 55, respectively, which extend transversely between the body side plate portions 49 and 50.

The hooks 41 and 42 are formed to fit beneath a gear or sprocket E to be pulled from a tapered shaft F. The shaft engaging thrust member 43 is mounted for axial slidable movement in a hole 57 provided therefor centrally of the transverse bottom portion 53. The top surface 43a of the shaft engaging thrust member 43 preferably is hardened, as by case hardening, as is also the periphery of the cam member 44, to prevent galling.

In using the device B (Figs. 4–7) the cam 44 is turned rotatively to its uppermost, inoperative position shown in Figs. 4 and 5 and in solid lines in Fig. 7, and the shaft engaging plunger 43 is raised to its maximum permissible height in the body cross member 53. The latter then is fitted over the threaded extension 59 of a tapered shaft F from which a sprocket E is to be pulled, and the hooks 41 and 42 are fitted beneath the marginal portions of the sprocket as shown in Fig. 4.

A suitable wrench (not shown) then is applied to the head portion 47 and is swung to forcibly rotate the cam 44 to drive the thrust member 43 axially downwardly toward its broken line position of Fig. 7. This moves the sprocket E axially upwardly relative to the shaft F and frees the sprocket from the shaft.

The invention provides a simple, inexpensive and effective gear puller which has particular ability to operate in restricted areas where the gear or sprocket to be pulled is closely surrounded by other portions of a mechanism, and the form of the invention shown in Figs. 1–3 is adjustable to accommodate gears of widely varying diameters.

While I have illustrated and described a preferred embodiment of the present invention, and one modified form thereof, it will be understood however, that other changes and modifications may be made in the details thereof without departing from the scope of the invention as set forth in the appended claims.

Having thus described the invention, what I claim as new and desire to protect by Letters Patent is defined in the following claims.

I claim:

1. A gear puller for pulling a gear from a tapered shaft, said puller comprising an elongated body bar, a first gear engaging hook pivotally mounted on one end of said body bar, a shaft engaging member extending from the bar in the same direction as the first hook and having a shaft engaging socket in an end thereof, means guiding the shaft engaging member for longitudinal, non-rotative movement on the body bar, a slider mounted on said body bar on the opposite side of said shaft engaging member from the first hook, a first lever pivotally mounted on said slider and having portions thereof extending in opposite directions from a pivotal support thereof, a second gear engaging hook mounted on one end of said first lever, each of said first and second hooks being of a length to engage the under side of a gear to be pulled with a shaft engaging member in endwise engagement with a tapered shaft from which such gear is to be pulled, the other end of said first lever being spaced from the slider, a second lever pivotally mounted on said slider and having a short nose portion thereof interposed between the free end of said first lever and the slider, said second lever having a gripping portion of substantially greater length than the nose portion thereof and extending oppositely thereto from a pivotal support of the second lever, said gripping portion being spaced from the body bar by a distance whereby the body bar and said gripping portion may be gripped and drawn together by a hand, thereby to force the nose portion away from the body bar and said one end of the first lever toward the body bar, whereby the hooks exert a pulling force on a gear engaged thereby.

2. A gear puller for pulling a gear from a tapered shaft, said puller comprising an elongated body bar, a first gear engaging hook pivotally mounted on one end of said body bar, a shaft engaging member extending from the body bar in the same direction as the first hook and having a shaft engaging socket in an end thereof, a first lever pivotally supported on said bar with arm portions thereof extending in opposite directions from a pivotal support thereof, a second gear engaging hook mounted on one end of said first lever, each of said first and second hooks being of a length to engage the under side of a gear to be pulled with a shaft engaging member in endwise engagement with a tapered shaft from which such gear is to be pulled, a second lever pivotally supported on said bar with a short nose portion thereof beneath the other end of said first lever from that having the second hook thereon, said second lever having a gripping portion of substantially greater length than the nose portion thereof extending oppositely thereto from a pivotal support of the second lever, said gripping portion being spaced from the body bar by a distance whereby the body bar and said gripping portion may be gripped and drawn together by a hand, thereby to force the nose portion away from the body bar and said one end of the first lever toward the body bar, whereby the hook on the first lever exerts a pulling force on a gear engaged thereby.

3. A gear puller for pulling a gear from a tapered shaft, said puller comprising an elongated body bar, a first gear engaging hook pivotally mounted on said body bar, a shaft engaging member mounted on said bar for limited adjustment lengthwise thereof, a slider mounted on said body bar on the opposite side of said shaft engaging member from the first hook, first lever means pivotally mounted on said slider, a second gear engaging hook mounted on said lever means, second lever means mounted on the slider and in force multiplying engagement with the first lever means, said second lever means having a gripping portion thereon spaced from the body bar, whereby the body bar and the gripping portion may be drawn together by a hand gripping them, with the hooks engaging a gear, and the shaft engaging member in compressive endwise engagement with a tapered shaft from which such gear is to be pulled, thereby to forcibly urge said second hook toward the body bar to exert a pulling force on a gear engaged thereby.

References Cited in the file of this patent

UNITED STATES PATENTS

| | | |
|---|---|---|
| 1,064,400 | Timmins | June 10, 1913 |
| 1,305,322 | Towler | June 3, 1919 |
| 1,451,852 | Verdoorn | Apr. 17, 1923 |
| 1,459,131 | Alexander | June 19, 1923 |
| 1,704,600 | Green | Mar. 5, 1929 |
| 1,865,420 | Kick | June 28, 1932 |
| 2,513,821 | Schneider | July 4, 1950 |

FOREIGN PATENTS

| | | |
|---|---|---|
| 739,366 | France | Jan. 11, 1933 |